(12) United States Patent
Tohara et al.

(10) Patent No.: US 9,030,747 B2
(45) Date of Patent: May 12, 2015

(54) IMAGE DISPLAY APPARATUS

(75) Inventors: Masakazu Tohara, Komae (JP); Kazutaka Inoguchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 147 days.

(21) Appl. No.: 13/595,051

(22) Filed: Aug. 27, 2012

(65) Prior Publication Data

US 2013/0050832 A1 Feb. 28, 2013

(30) Foreign Application Priority Data

Aug. 30, 2011 (JP) .................. 2011-186821

(51) Int. Cl.
*G02B 27/10* (2006.01)
*G02B 27/01* (2006.01)

(52) U.S. Cl.
CPC .... *G02B 27/0172* (2013.01); *G02B 2027/0123* (2013.01)

(58) Field of Classification Search
USPC .................................. 359/619–633
See application file for complete search history.

(56) References Cited

U.S. PATENT DOCUMENTS

| | | | |
|---|---|---|---|
| 5,751,494 A | 5/1998 | Takahashi | |
| 5,815,741 A | 9/1998 | Okuyama et al. | |
| 7,864,459 B2 | 1/2011 | Tohara et al. | |
| 8,437,087 B2 * | 5/2013 | Tohara et al. | 359/630 |
| 2008/0316606 A1 | 12/2008 | Inoguchi et al. | |
| 2009/0115842 A1 | 5/2009 | Saito et al. | |

FOREIGN PATENT DOCUMENTS

| | | | | |
|---|---|---|---|---|
| EP | 0687932 A2 | 12/1995 | | |
| EP | 2056153 A2 | 5/2009 | | |
| EP | 2071386 A2 | 6/2009 | | |
| JP | 08327946 A | 12/1996 | | |
| JP | 2009-115906 A | 5/2009 | | |
| JP | 2010-175574 | * | 8/2010 | ............ G02B 27/01 |
| JP | 2010-266787 A | 11/2010 | | |

OTHER PUBLICATIONS

European Search Report issued in European counterpart application No. EP12006136.1, dated May 7, 2013.
Partial European Search Report issued in European counterpart application No. EP12006136.1, dated Jan. 2, 2013.

* cited by examiner

*Primary Examiner* — Joseph P Martinez
*Assistant Examiner* — Brandi Thomas
(74) *Attorney, Agent, or Firm* — Rossi, Kimms & McDowell LLP (57) ABSTRACT

An image display apparatus includes a plurality of display elements each configured to display an original image, and an observation optical system configured to introduce light fluxes from the plurality of display elements to an exit pupil via a plurality of optical units, and to present a combined image. When a decentering section of each optical unit is defined as a section formed by a principal ray of the light flux introduced to the same image point in the combined image when the principal ray is reflected, the plurality of optical units are arranged so that decentering sections of the plurality of optical units are parallel. The plurality of display elements includes two neighboring display elements, and display planes of the two display elements partially display the same image.

20 Claims, 8 Drawing Sheets

IMAGE DISPLAY APPARATUS

BACKGROUND OF THE INVENTION

1. Field of the Invention

The present invention relates to an image display apparatus, such as a head mount display ("HMD"), which includes an observation optical system configured to present one combined image by combining light fluxes from a plurality of display elements.

2. Description of the Related Art

The HMD needs a small observation optical system configured to lead an image at a wide angle to an exit pupil (eyeball), and a variety of structures for downsizing the optical unit corresponding to each display element are conventionally proposed with a plurality of display elements.

For example, Japanese Patent Laid-Open No. ("JP") 2009-115906 discloses an image display apparatus that piles two optical elements each including three display elements and three optical units. JP 2010-266787 discloses an image display apparatus that includes an observation optical system that enables light fluxes from a plurality of images to the same image have an overlap in the exit pupil, and an image display apparatus having an overlap area configured to display the same image and partially provided to the plurality of display elements.

It is difficult for JP 2009-115906 to observe a smooth and continuous image because an image gets chipped near the boundary when the eyeball rotates. In this case, it is conceivable to apply the method disclosed in JP 2010-266787 to prevent the image from getting chipped near the boundary when the eyeball rotates, but according to both JP 2009-115906 and JP 2010-266787, a slope angle of each of the plurality of display elements is different from each other and the HMD is likely to have a large size.

SUMMARY OF THE INVENTION

The present invention provides a small image display apparatus configured to present one image at a wide field angle by combining light fluxes from a plurality of display elements.

An image display apparatus according to the present invention includes a plurality of display elements each configured to display an original image, and an observation optical system configured to introduce light fluxes from the plurality of display elements to an exit pupil via a plurality of optical units, and to present a combined image. When a decentering section of each optical unit is defined as a section formed by a principal ray of the light flux introduced to the same image point in the combined image when the principal ray is reflected, the plurality of optical units are arranged so that decentering sections of the plurality of optical units are parallel. The plurality of display elements include two neighboring display elements, and display planes of the two display elements partially display the same image.

Further features of the present invention will become apparent from the following description of exemplary embodiments with reference to the attached drawings.

DESCRIPTION OF THE EMBODIMENTS

Referring now to the accompanying drawings, a description will now be given of a variety of observation optical systems according to embodiments of the present invention. The observation optical system introduces light fluxes from a plurality of display elements each configured to display an original image to an exit pupil via a plurality of optical units and presents a combined image. The observation optical system is suitable for an image display apparatus, such as an HMD.

Herein, there are defined a Z axis in which a direction parallel to a visual axis OA from an eyeball of an observer to an observation optical system is positive, a Y axis orthogonal to the Z axis, in which an upward vertical direction is positive from the eyeball of the observer, and an X axis in which a left horizontal direction is positive from the eyeball of the observer.

First Embodiment

Figure 1A:
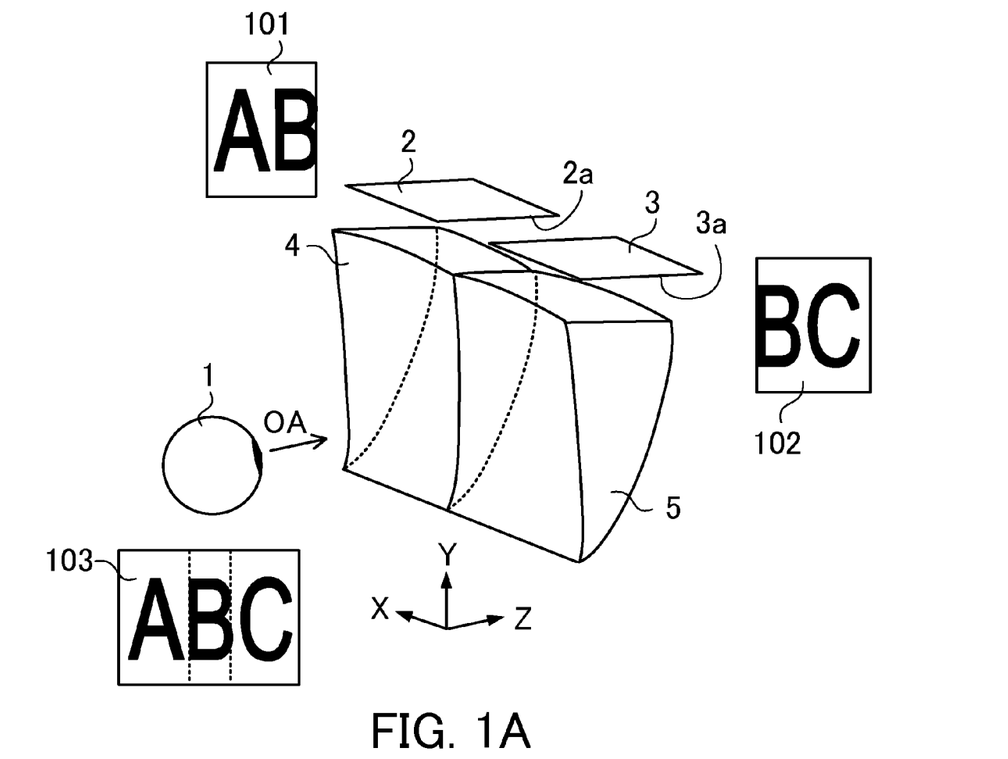
FIGS. 1A and 1B are perspective and side views of an observation optical system according to a first embodiment.
Figure 1B:
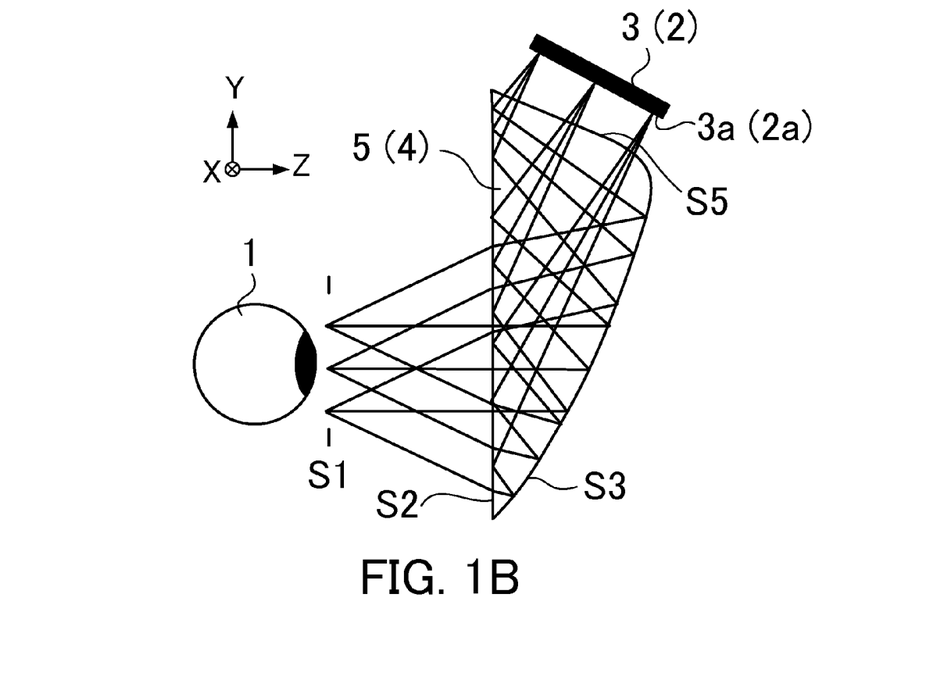

FIG. 1A is a perspective view of an observation optical system according to a first embodiment, and FIG. 1B is its side view. In FIGS. 1A and 1B, reference numeral 1 denotes an eyeball of an observer, arranged at or near a position of an exit pupil S1 of the observation optical system. Reference numeral 2 denotes a (first) display element configured to display an original image, and reference numeral 3 denotes a (second) display element configured to display an original image. Reference numeral 4 denotes a (first) optical unit, and reference numeral 5 denotes a (second) optical unit. The optical units 4 and 5 constitute an optical element.

Reference numeral 101 denotes a (first original) image displayed on a display plane 2a of the display element 2, reference numeral 102 denotes a (second original) image displayed on a display plane 3a of the display element 3, and reference numeral 103 denotes a combined image observed by the observer via the observation optical system.

As illustrated in FIG. 1B, the light fluxes from the display elements 2 and 3 enter the incident surfaces S5 of the optical units 4 and 5, are reflected on surfaces S2 that may be curved surfaces, are reflected on surfaces S3, transmit the surfaces S2, and reach the exit pupil S1. Thus, the surfaces S5 serve as transmitting surfaces, the surfaces S3 serve as reflective surfaces, and the surfaces S2 serve as transmitting and reflective surfaces. With respect to the visual axis OA, the incident surfaces S5 of the optical units 4 and 5 are located on the same side and the display planes 2a and 3a of the display elements 2 and 3 are located on the same side.

A decentering section of each of the optical units 4 and 5 is defined as a section in which an optical path is bent by the reflection on the surface S3 (a section formed by a principal ray of a light flux introduced to the same image point in the combined image when the principal ray is reflected). The surface S3 inclines or decenters relative to the visual axis OA of the observer. In FIG. 1B, the surface S3 is a decentering reflective curved surface. The decentering sections of the plurality of optical units 4 and 5 are not parallel, and form a line of intersection. The plurality of optical units 4 and 5 are arranged so that the line of intersection between the decentering sections does not accord with a line that is made by connecting the center of the exit pupil with one arbitrary point in the combined image.

The display elements 2 and 3 are selfluminous type two-dimensional image display elements, such as organic EL, but may use a compact display, such as a transmitting liquid crystal panel ("LCD"), when it is combined with a backlight.

The two display elements 2 and 3 are located adjacent to each other, and the display planes 2a and 3a partially have overlap areas each configured to display the same image. These two overlap areas are located adjacent to each other, and display the same image duplicately.

In other words, as understood from the two images 101 and 102 illustrated in FIG. 1A, the display element 2 has a normal (non-overlap) display area configured to display an image A and an overlap area configured to display an image B. The display element 3 has an overlap area configured to display an image B and a normal (non-overlap) display area configured to display an image C.

The two images 101 and 102 have parts corresponding to angles of view different from each other on the YZ plane (for the A and C parts) and parts corresponding to the same angle of view (for the B parts). The overlap area of the display element 2 is provided on a side of the display element 3 and the overlap area of the display element 3 is provided on a side of the display element 2.

The display elements 2 and 3 have rectangular shapes, and their display planes 2a and 3a are arranged parallel and adjacent to each other so that they form the same plane and slightly incline relative to the XZ plane. Thereby, the observation optical system becomes smaller (thinner) in the Y axis direction than the conventional structure in which the display elements 2 and 3 are arranged at different slope angles.

In particular, when the display elements are arranged at different slope angles, an electronic circuit substrate (not illustrated) mounted with each display element and configured to drive each display element is arranged parallel to the display element at a similar angle. Therefore, the conventional structure has a problem in that the space around the display element is likely to be large in the Y axis direction. The observation optical system of this embodiment solves this problem, and achieves a compact structure in the Y axis direction. According to this embodiment, the electronic circuit substrate can be commonly used to drive the display elements 2 and 3, and the miniaturization of the observation optical system in the Y axis direction is promoted in this case.

In FIG. 1A, the field angle in the horizontal direction is divided into two. The display field angle is set to a horizontal field angle of 50° and a vertical field angle of 38°. The overlap area displays the same image in an angular range of 24° between the two display elements 2 and 3. Thus, an image for 37° (25°+12°) is displayed from one display element in the horizontal direction.

This embodiment folds an optical path utilizing a plurality of decentering reflective curved surfaces of the optical units 4 and 5, and reduces a size of the observation optical system in the Z axis direction. Each optical unit is similar to a triangular pole shape. Each of the optical units 4 and 5 is made of a transparent material filled with an optical medium, such as glass or plastic, which has a refractive index higher than 1.

The exit surfaces of the optical units 4 and 5 may provide the same optical surface. The same optical surface maintains the continuity of the light flux that has passed the optical unit from the plurality of display elements, and enables a smooth and continuous image to be observed.

As illustrated in FIG. 1B, a ray from the display element 2 is twice reflected in the optical unit 4, a ray from the display element 3 is twice reflected in the optical unit 5, and these rays are guided to the eyeball 1. The surface S2 has a surface serving a reflection and transmission, and an internal total reflection may be desirable so as to cut a loss of the light quantity. In addition, when all surfaces of the optical units 4 and 5 (surfaces S2, S3 and S5) on the optical paths are curved surface, all surfaces contribute to converging, diverging, or aberrational corrections, and are expected to provide an effect of the cost reduction by reducing unnecessary surfaces.

When at least one surface in the optical units 4 and 5 or all surfaces (such as the surfaces S2, S3, and S5) have rotationally asymmetrical shapes, the degree of freedom of correcting the decentering aberrations increases, and a high-quality image can be displayed. At this time, when each rotationally asymmetrical surface is plane-symmetrical with respect to the decentering section as a sole symmetrical surface, working and manufacturing become easier than the asymmetrical case.

Figure 2A:
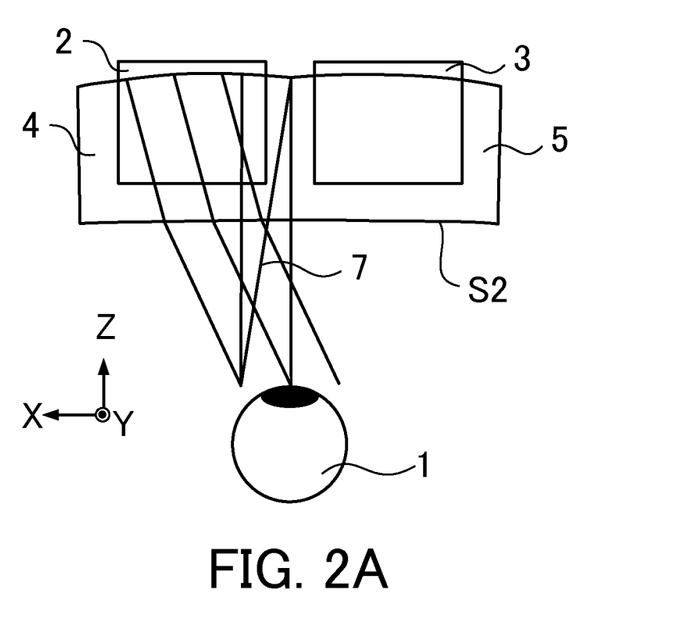
FIGS. 2A and 2B are top views of the observation optical system illustrated in FIGS. 1A and 1B according to the first embodiment.
Figure 2B:
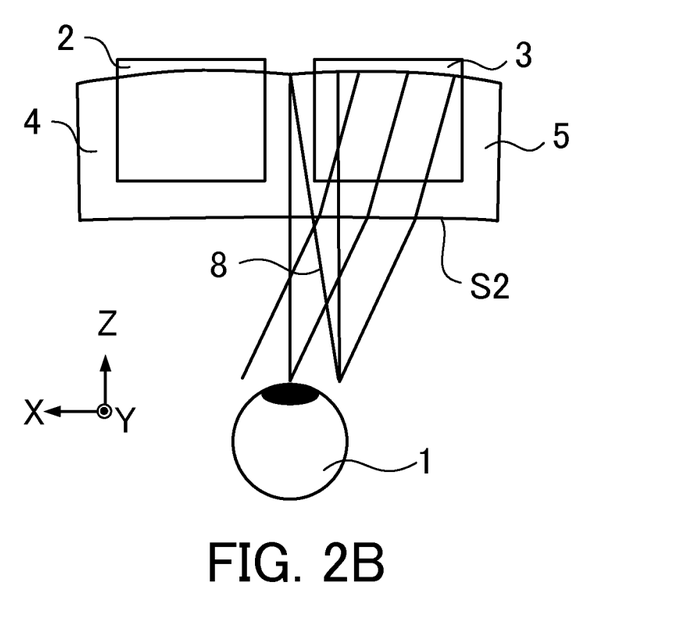

FIG. 2A illustrates rays led to the eyeball 1 from the display element 2, and FIG. 2B illustrates rays led to the eyeball 1 from the display element 3.

As illustrated in FIGS. 2A and 2B, a ray at a left field angle and a ray 7 at a right field angle corresponding to the overlap area are led to the eyeball 1 from the display element 2. A ray 8 at a left field angle corresponding to the overlap area and a ray having a right field angle are led to the eyeball 1 from the display element 3.

Due to the overlap areas configured to duplicately display the same image in the combined image, chipping of the image can be prevented near the boundary of the combined image, and a seamless image can be observed when the eyeball rotates. In addition, a shift of the boundary in the combined image caused by a manufacturing error of a prism and a positional offset between the display element and the prism can be adjusted in the overlap areas.

Since the overlap areas in the combined image, in which images from the two display elements overlap each other, the brightness becomes twice as high as the other image portions. There may be provided a light-intensity controller configured to control the light intensity at the exit pupil about the overlap area configured to display the same image.

For example, a light attenuator, such as an ND filter may be arranged above the overlap area in the image of the display element, or an image that has previously reduced brightness may be displayed. In order to reduce the brightness on the display element, the brightness may be half as low as another image over the overlap area, or the brightness may be gradually reduced as a position approaches to the end of the display element. The latter case provides a more natural combined image because the brightness gently changes on the display element.

In the optical system that utilizes the decentering reflective curved surface as in this embodiment, the aberrations are less influential when the power of the optical system is increased in the direction vertical to the decentering section. Hence, the power can be increased when the display field angle is widened by the overlap area. Since the focal length becomes shorter, the size vertical to the decentering section can be reduced.

This embodiment forms the optical units 4 and 5 as two separate members, and then joints them with each other. Jointing the optical units 4 and 5 eliminates the air layer between them, makes the refraction little influential, and enables a smooth and continuous image to be observed. In addition, when two optical units are jointed into one optical element, handling becomes easier.

Figure 3:
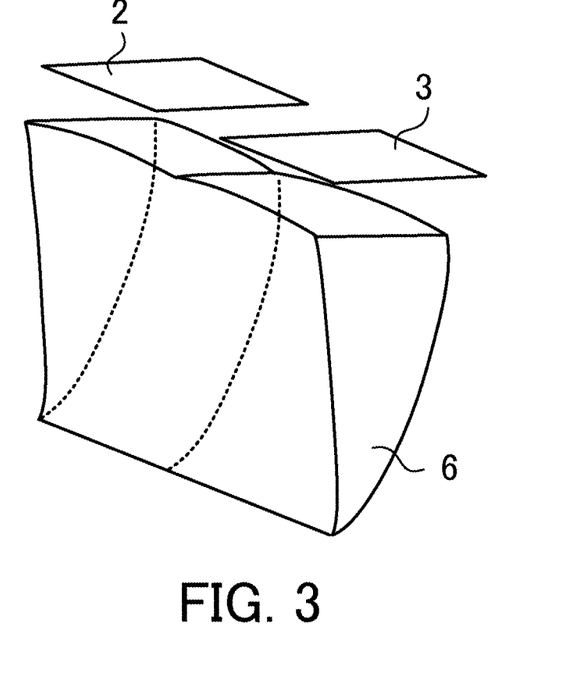
FIG. 3 is a perspective view of a modification of the observation optical system illustrated in FIGS. 1A and 1B according to the first embodiment.

While the optical element (prism) of this embodiment includes two optical units 4 and 5, the number of optical units is not limited to two, and may be one as illustrated in FIG. 3, or three or more as in the second embodiment, which will be described later.

FIG. 3 is a perspective view when two optical units are formed in an optical unit 6. Thereby, handling of the optical element becomes simpler, and holding becomes easier. As described above, the exit surface of the optical unit 6 is the same plane parallel to the XY plane, and enables a smooth and continuous image to be observed while the continuity of the light flux that has passed the optical unit 6 is maintained.

While this embodiment utilizes the observation optical system that divides the horizontal field angle into two in the X axis direction, this embodiment is applicable to an optical system that divides the vertical field angle into two in the Y direction. Each optical unit may be inclined and the line of intersection between the decentering sections may not be parallel to the Y axis. A plurality of optical unit may be arranged so that the decentering sections can be parallel to each other instead of intersecting each other.

This embodiment closely arranges the display elements 2 and 3 by arranging two optical units so that the line of intersection between the decentering sections of the optical units can be parallel to the Y axis, and by dividing the horizontal field angle into two. This configuration can make compact the space around the display elements 2 and 3, and enables one electronic circuit substrate to drive a plurality of display elements.

Second Embodiment

Figure 4A:
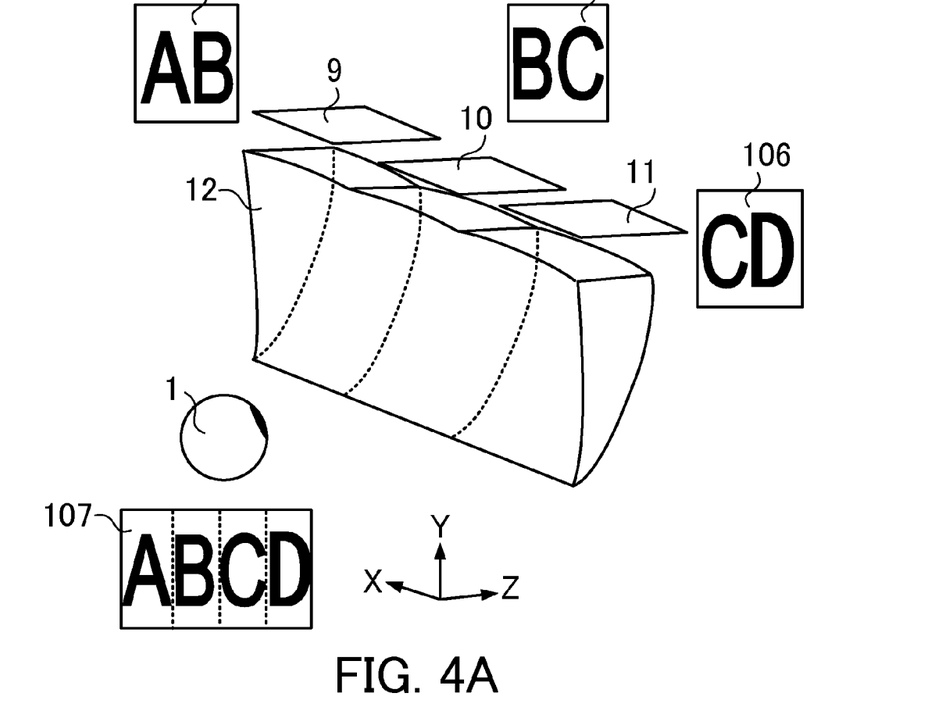
FIGS. 4A and 4B are perspective and side views of an observation optical system according to a second embodiment.
Figure 4B:
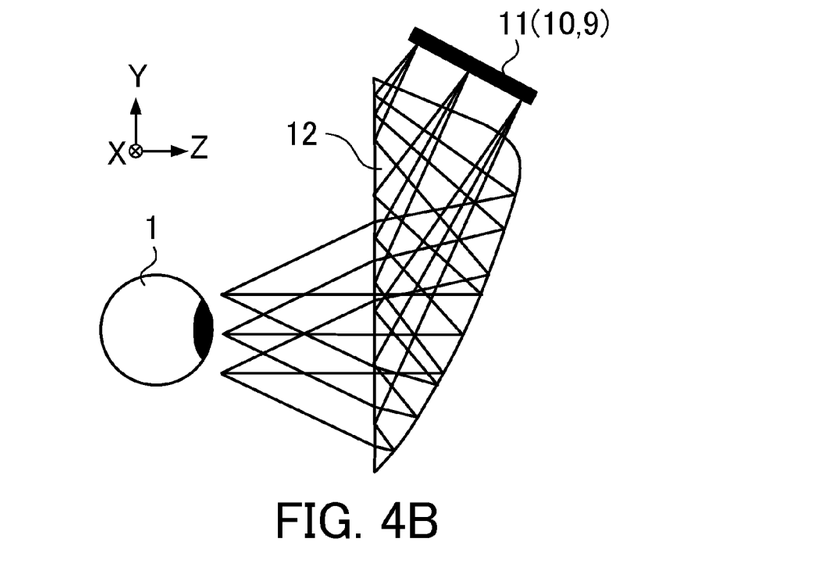

FIG. 4A is a perspective view of an observation optical system according to a second embodiment, and FIG. 4B is its side view.

This embodiment divides a horizontal field angle into three. The display field angle is set to a horizontal field angle of 100° and a vertical field angle of 38°. The overlap area displays the same image in an angular range of 10° between the two neighboring display elements 2 and 3.

In FIGS. 4A and 4B, reference numeral 9 denotes a (first) display element configured to display an original image, reference numeral 10 denotes a (second) display element configured to display an original image, and reference numeral 11 denotes a (third) display element configured to display an original image. Reference numeral denotes an optical element. Reference numeral 104 denotes a (first) image displayed on the display element 9, reference numeral 105 denotes a (second) image displayed on the display element 10, reference numeral 106 denotes a (third) image displayed on the display element 11, and reference numeral 107 denotes a combined image observed by the observer via the observation optical system.

The display elements 9, 10, and 11 are structurally similar to the display elements 2 and 3. The two neighboring display elements 9 and 10 and the two neighboring display elements 10 and 11 have overlap areas configured to display the same images. The overlap areas are arranged adjacent to each other in the two neighboring display elements, similar to the first embodiment.

The display elements 9, 10, and 11 have rectangular shapes and are arranged adjacent to one another so that they form the same plane. Thereby, the observation optical system becomes smaller (thinner) in the Y axis direction than the conventional structure in which the display elements 9, 10, and 11 are arranged at different slope angles.

In particular, when the display elements are arranged at different slope angles, electronic circuit substrates (not illustrated) each mounted with and configured to drive a corresponding one of display elements are arranged parallel to the display elements at similar slope angles. Therefore, the conventional structure has a problem in that the space around the display elements is likely to enlarge in the Y axis direction. The observation optical system of this embodiment solves this problem, and achieves a compact structure in the Y axis direction. According to this embodiment, the electronic circuit substrate can be commonly used to drive the display elements 9, 10, and 11, and the miniaturization of the observation optical system in the Y axis direction is promoted in this case.

The display element 9 displays an image in an angular range of 35° between the horizontal field angle of +50° and the horizontal field angle of +15°. The display element 10 displays an image in an angular range of 50° between the horizontal field angle of +25° and the horizontal field angle of −25°. The display element 11 displays an image in an angular range of 35° between the horizontal field angle of −15° and the horizontal field angle of −50°.

The material and function of the optical unit of the optical element 12 are similar to those of the first embodiment. It is similar to the first embodiment that the optical unit reflects the light flux twice, the internal total reflection may be formed, and the curved outer surface having a rotationally asymmetrical shape may be formed.

Figure 5A:
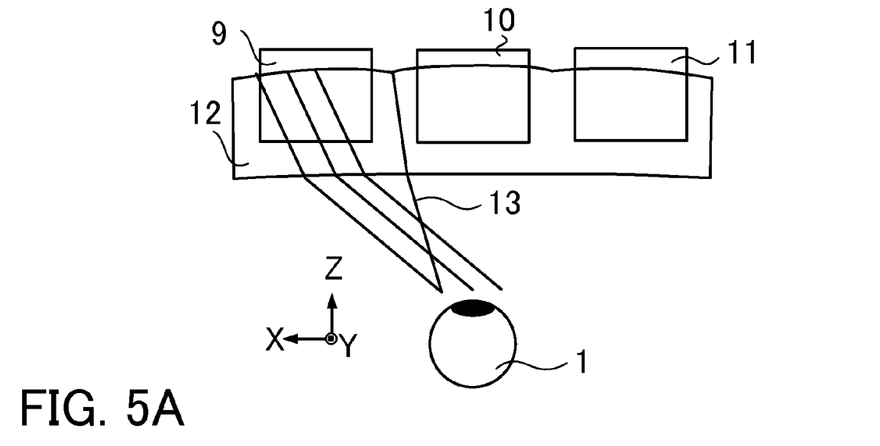
FIGS. 5A, 5B, and 5C are top views of the observation optical system illustrated in FIGS. 4A and 4B according to the second embodiment.
Figure 5B:
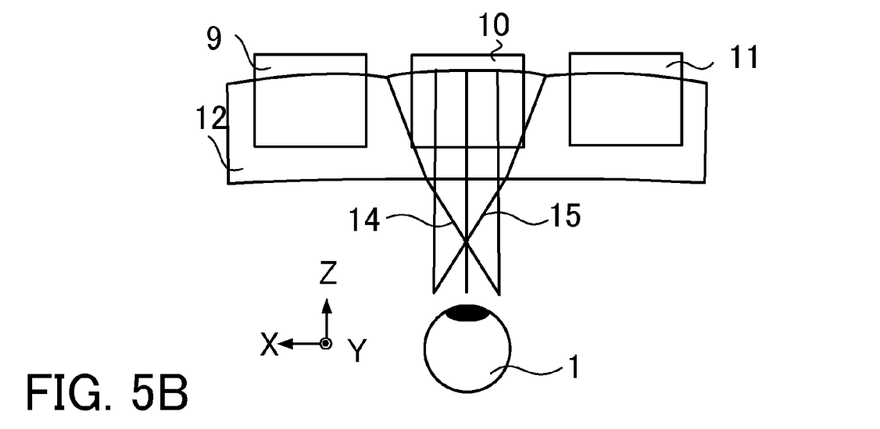
Figure 5C:
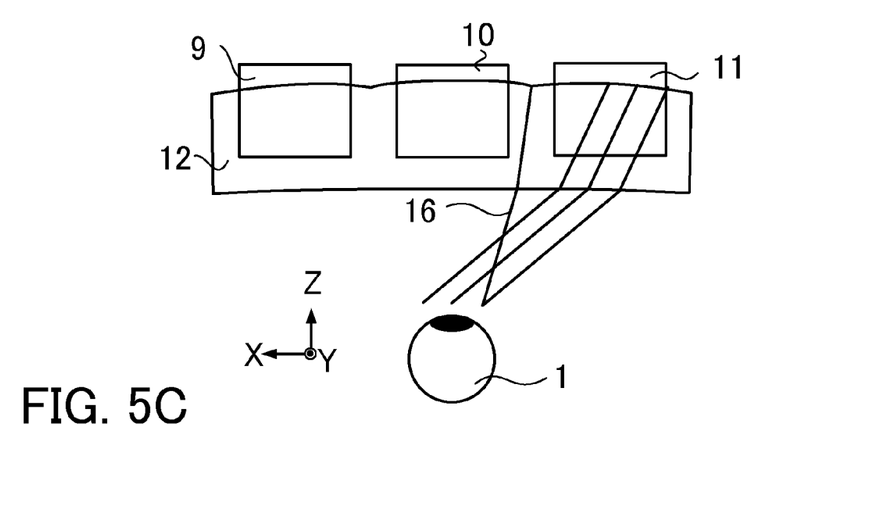

FIG. 5A illustrates rays introduced to the eyeball 1 from the display element 9, FIG. 5B illustrates rays introduced to the eyeball 1 from the display element 10, and FIG. 5C illustrates rays introduced to the eyeball 1 from the display element 11. As illustrated in FIG. 5A, a ray having a left field angle and a ray 13 having a right field angle corresponding to the overlap area are introduced into the eyeball 1 from the display element 9. As illustrated in FIG. 5B, a ray 14 having a left field angle corresponding to the overlap area and a ray 15 having a right field angle corresponding to the overlap area are introduced into the eyeball 1 from the display element 10. As illustrated in FIG. 5C, a ray 16 having a left field angle corresponding to the overlap area and a ray having a right field angle are introduced into the eyeball 1 from the display element 11.

Due to the overlap areas, this embodiment, similar to the first embodiment, can prevent an image from chipping when the eyeball rotates, and absorb a manufacturing error of the prism and a positional offset between the display element and the prism. It is similar to the first embodiment that the light-intensity controller may be provided for the overlap area, and the miniaturization can be achieved by increasing the power when the overlap area widens the display field angle.

Even in this embodiment, a plurality of optical units may be integrated, similar to the first embodiment. At this time, the exit surfaces of the three optical units may provide the same plane. In addition, when there are three optical units, the two neighboring optical units may be jointed together.

While this embodiment utilizes the observation optical system configured to divide the horizontal field angle in the X axis direction into three, this embodiment is applicable to an optical system configured to divide the vertical field angle into three in the Y axis direction.

This embodiment closely arranges the display elements 9, 10, and 11 by dividing the horizontal field angle into three. This configuration can make compact the space around the display elements, and enables one electronic circuit substrate to drive a plurality of display elements.

Third Embodiment

Figure 6A:
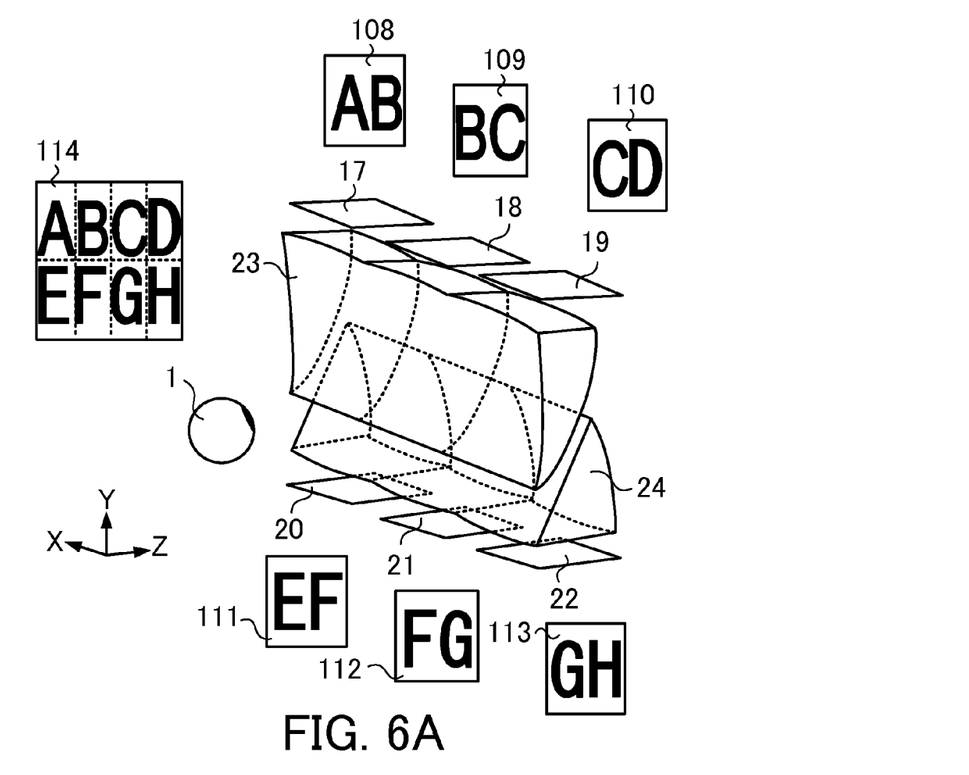
FIGS. 6A and 6B are perspective and side views of an observation optical system according to a third embodiment.
Figure 6B:
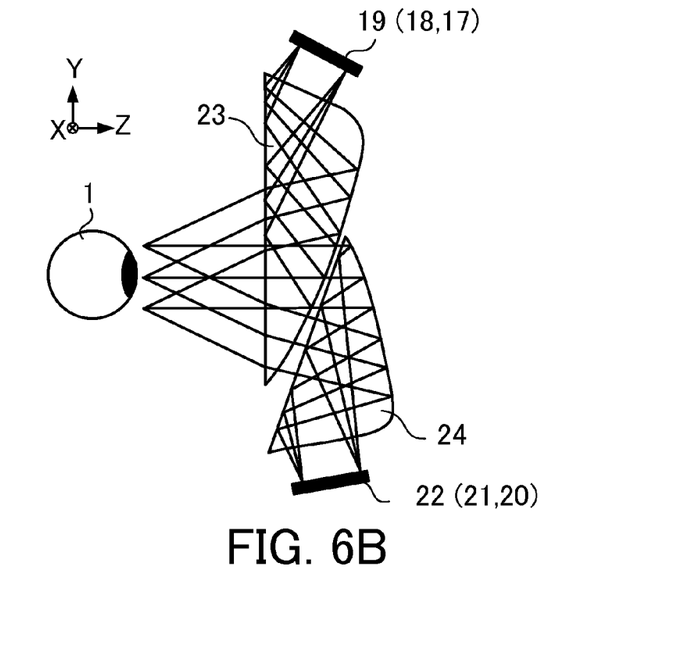

FIG. 6A is a perspective view of an observation optical system according to a third embodiment, and FIG. 6B is its side view.

This embodiment arranges two optical elements (prisms) 23 and 24 each of which divides a horizontal field angle into three, so as to divide a vertical field angle into two.

The display field angle is set to a horizontal field angle of 100° and a vertical field angle of 38°. The overlap area displays the same image between the two neighboring elements corresponds to 10°. Although there is no overlap area in the vertical direction, the light fluxes introduced to the same image point in the combined image have an overlap in the exit pupil plane.

In FIGS. 6A and 6B, reference numerals 17 to 19 denote first to third display elements each configured to display an original image. Reference numerals 20 to 22 denote fourth to sixth display elements each configured to display an original image. Reference numerals 23 and 24 denote first and second optical elements each including three optical units. Reference numerals 108 to 110 denote first to third images displayed on the display elements 17 to 19. Reference numerals 111 to 113 denote fourth to sixth images displayed on the display elements 20 to 22. Reference numeral 114 denotes a combined image observed by the observer via the observation optical system. Incident surfaces of the plurality of optical units of the first optical element 23 are arranged opposite to those of the plurality of optical units of the second optical element 24 with respect to the visual axis.

The display elements 17 to 22 are structurally similar to the display elements 2 and 3. Each pair of two neighboring display elements 17 and 18, 18 and 19, and 20 and 21, and 21 and 22 has overlap areas so as to display the same image. The overlap areas are arranged adjacent to each other in the two neighboring display elements, similar to the first embodiment.

The display elements 17 to 19 have rectangular shapes, and are arranged adjacent to one another so that they form the same plane. Thereby, the observation optical system becomes smaller (thinner) in the Y axis direction than the conventional structure in which the display elements 17 to 19 are arranged at different slope angles.

The display elements 20 to 22 have rectangular shapes, and are arranged adjacent to one another so that they form the same plane. Thereby, the observation optical system becomes smaller (thinner) in the Y axis direction than the conventional structure in which the display elements 20 to 22 are arranged at different slope angles. In the meanwhile, the display planes of the upper and lower display elements are not parallel to each other.

In particular, when the display elements are arranged at different slope angles, electronic circuit substrates (not illustrated) each mounted with and configured to drive a corresponding one of display elements are arranged parallel to the display elements at similar slope angles. Therefore, the conventional structure has a problem in that the space around the display elements is likely to be large in the Y axis direction. The observation optical system of this embodiment solves this problem, and achieves a compact structure in the Y axis direction. According to this embodiment, the electronic circuit substrate is commonly used to drive the display elements 17 to 19, and the electronic circuit substrate is commonly used to drive the display elements 20 to 22, and the miniaturization of the observation optical system in the Y axis direction is promoted in this case.

The display element 17 displays an image in an angular range of 35° between the horizontal field angle of +50° and the horizontal field angle of +15°. The display element 18 displays an image in an angular range of 50° between the horizontal field angle of +25° and the horizontal field angle of −25°. The display element 19 displays an image in an angular range of 35° between the horizontal field angle of −15° and the horizontal field angle −50°. The vertical field angle displayed by the display elements 17, 18, and 19 have no overlap areas, and the upper half corresponds to an angular range of 19°.

The display element 20 displays an image in an angular range of 35° between the horizontal field angle of +50° and the horizontal field angle of +15°. The display element 21 displays an image in an angular range of 50° between the horizontal field angle of +25° and the horizontal field angle of −25°. The display element 22 displays an image in an angular range of 35° between the horizontal field angle of −15° and the horizontal field angle of −50°. The vertical field angle displayed by the display elements 20, 21, and 22 have no overlap areas, and the lower half corresponds to an angular range of 19°.

This embodiment folds an optical path utilizing a plurality of decentering reflective curved surfaces of the optical units of the optical elements 23 and 24, and reduces the size of the observation optical system in the Z axis direction. Each optical unit of the optical elements 23 and 24 is similar to a triangular pole shape, but each optical unit in the optical element 23 has a shape different from that of the optical element 24. Each of the optical elements 23 and 24 is made of a material similar to that of the first embodiment.

This embodiment divides the original image into two in the vertical direction, and makes thinner the observation optical system in the Z axis direction. The decentering section of the optical unit at the center of the optical element 23 is the same as that of the optical unit at the center of the optical element 24.

As illustrated in FIG. 6B, a ray from each of the display elements 17, 18, and 19 is twice reflected in a corresponding one of the optical units in the optical element 23, and led to the eyeball 1. A ray from each of the display elements 20, 21, and 22 is twice reflected in a corresponding one of the optical units in the optical element 24, and led to the eyeball 1 through the optical element 23.

It is similar to the first embodiment that each of the exit surface of the optical element 23 to the eyeball and the exit surface of the optical element 24 to the optical element 23 may provide the internal total reflection. It is also similar to the first embodiment that all surfaces of the optical elements 23 and 24 on the optical paths may be curved. It is also similar to the first embodiment that at least one surface in the optical elements 23 and 24 or all surfaces may have rotationally asymmetrical shapes.

This embodiment also provides the overlap area configured to display the same image, to the image on each display element that is divided in the horizontal direction. Therefore, the overlap area can prevent an image from chipping when the eyeball rotates in the horizontal direction, and absorb a manufacturing error of a prism and a positional offset between the display element and the prism.

This embodiment provides no overlap area in the divisions in the vertical direction, but instead the light fluxes introduced to the same image point in the combined image have an overlap in the exit pupil. Even in this configuration, similar to case where the overlap area is provided, the light fluxes of any angles of view are introduced to the exit pupil, and thus chipping of the image can be eliminated when the eyeball rotates in the vertical direction.

It is similar to the first embodiment that the light-intensity controller for each of the overlap area and the overlap section may be provided, and the miniaturization can be achieved by increasing the power when the overlap area widens the display field angle.

This embodiment may integrate three optical units into one optical element that serves as the optical elements 23 and 24. The exit surfaces of the three optical units may form the same plane. Similar to the first embodiment, when there are three optical units, the two neighboring optical units may be joined together.

Thus, an image at a wider field angle can be displayed by increasing the number of divisions in the combined image, and the size of each usable display element can be reduced. Thus, an image display apparatus providing an intended display field angle can be realized without relying upon the size of the usable display element.

This embodiment divides the horizontal field angle into three in the X axis direction, and the vertical field angle into two in the Y axis direction, providing the observation optical system configured to provide totally six divisions. The six divisions may be provided by exchanging the X axis and the Y axis. Each optical unit may be inclined and the line of intersection between the decentering sections may not be parallel to the Y axis. Moreover, similar to the division in the horizontal direction, the overlap area may be provided for the divisions in the vertical direction.

This embodiment closely arranges display elements by positioning three optical units, and two optical elements each configured to divide the horizontal field angle into three so that they can divide the vertical field angle into two. This configuration can make compact the space around the display elements, and enables one electronic circuit substrate to drive a plurality of display elements.

Fourth Embodiment

Figure 7A:
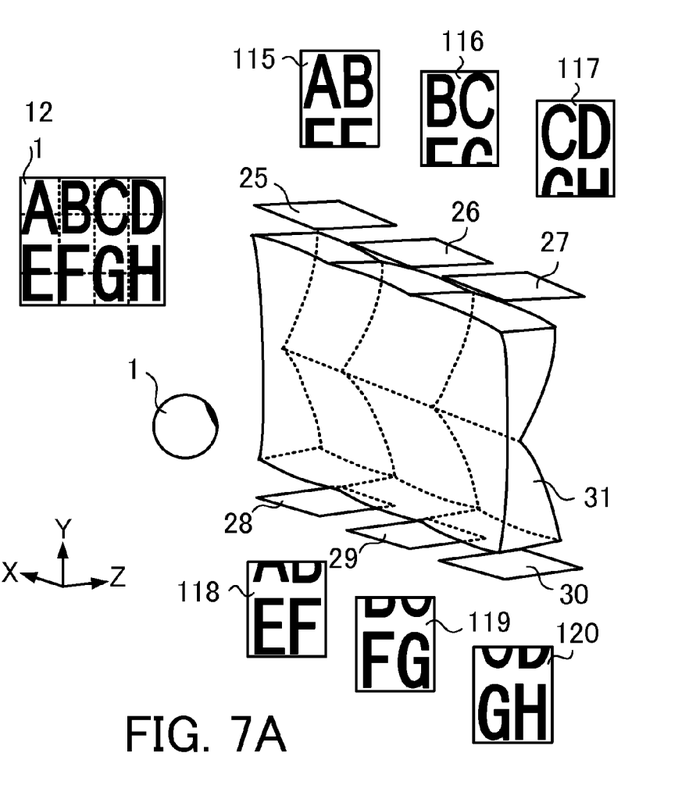
FIGS. 7A and 7B are perspective and side views of an observation optical system according to a fourth embodiment.
Figure 7B:
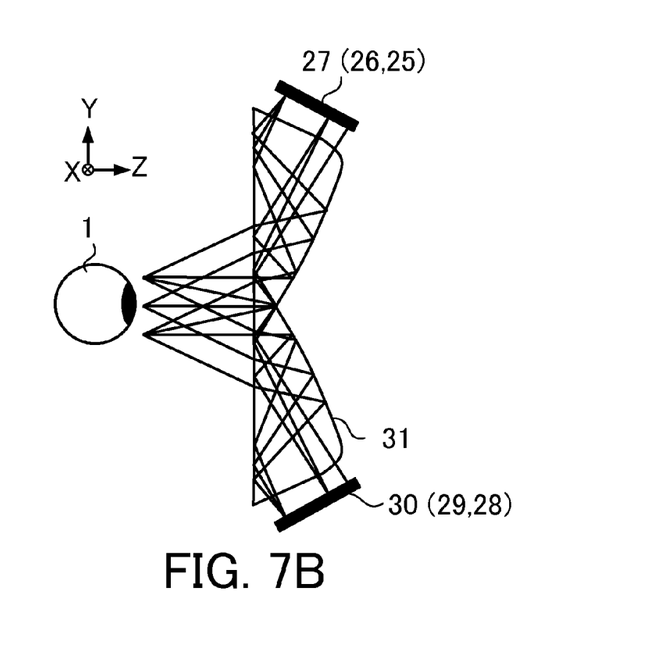

FIG. 7A is a perspective view of an observation optical system according to a fourth embodiment, and FIG. 7B is its side view.

The optical element (prism) 31 of this embodiment arranges three optical units, divides a horizontal field angle into three, and a vertical field angle into two by arranging another pair of three optical units upside down.

The display field angle is set to a horizontal field angle of 100° and a vertical field angle of 38°. The overlap area displays the same image in an angular range of 10° between the two neighboring elements in the horizontal direction. The overlap area displays the same image in an angular range of 20° between the two neighboring elements in the perpendicular direction.

In FIGS. 7A and 7B, reference numerals 25 to 27 denote first to third display elements each configured to display an original image. Reference numerals 28 to 30 denote fourth to sixth display elements each configured to display an original image. Reference numeral 31 denotes an optical element including six optical units. Reference numerals 115 to 117 denote first to third images displayed on the display elements 25 to 27. Reference numerals 118 to 120 are fourth to sixth images displayed on the display elements 28 to 30. Reference numeral 121 denotes a combined image observed by the observer via the observation optical system.

The display elements 25 to 30 are structurally similar to the display elements 2 and 3. Each pair of the two neighboring display elements 25 and 26, 26 and 27, 28 and 29, and 29 and 30 in the horizontal direction has overlap areas so as to display the same image. The overlap areas are arranged adjacent to each other in the two neighboring display elements, similar to the first embodiment. Each pair of the two neighboring display elements 25 and 28, 26 and 29, and 27 and 30 in the perpendicular direction has overlap areas so as to display the same image.

The display elements 25 to 27 have rectangular shapes, and are arranged adjacent to one another so that they form the same plane. Thereby, the observation optical system becomes smaller (thinner) in the Y axis direction than the conventional structure in which the display elements 25 to 27 are arranged at different slope angles.

The display elements 28 to 30 have rectangular shapes, and are arranged adjacent to one another so that they form the same plane. Thereby, the observation optical system becomes smaller (thinner) in the Y axis direction than the conventional structure in which the display elements 28 to 30 are arranged at different slope angles. In the meanwhile, the upper and lower display planes of the display elements are not parallel to one another.

In particular, when the display elements are arranged at different slope angles, electronic circuit substrates (not illustrated) each mounted with and configured to drive a corresponding one of display elements are arranged parallel to the display elements at similar slope angles. Therefore, the conventional structure has a problem in that the space around the display elements is likely to enlarge in the Y axis direction. The observation optical system of this embodiment solves this problem, and achieves a compact structure in the Y axis direction. According to this embodiment, the electronic circuit substrate can be commonly used to drive the display elements 25 to 27, the electronic circuit substrate can be commonly used to drive the display elements 28 to 30, and the miniaturization of the observation optical system in the Y axis direction is promoted in this case.

The display element 25 displays an image in an angular range of 35° between the horizontal field angle of +50° and the horizontal field angle of +15°. The display element 26 displays an image in an angular range of 50° between the horizontal field angle of +25° and the horizontal field angle of −25°. The display element 27 displays an image in an angular range of 35° between the horizontal field angle of −15° and the horizontal field angle −50°. The vertical field angle displayed by the display elements 25, 26, and 27 has an angular range of 29° between +19° and −10° because the overlap area has an angular range of 20°.

The display element 28 displays an image in an angular range of 35° between the horizontal field angle of +50° and the horizontal field angle of +15°. The display element 29 displays an image in an angular range of 50° between the horizontal field angle of +25° and the horizontal field angle of −25°. The display element 30 displays an image in an angular range of 35° between the horizontal field angle of −15° and the horizontal field angle of −50°. The vertical field angle displayed by the display elements 28, 29, and 30 has an angular range of 29° between +10° and −19° because the overlap area has an angular range of 20°.

This embodiment folds an optical path utilizing a plurality of decentering reflective curved surfaces of the optical units, and reduces the size of the observation optical system in the Z axis direction. The optical element 31 is made of a material similar to that of the first embodiment. The upper and lower optical units are symmetrically arranged.

This embodiment divides the original image into two in the vertical direction, and makes thinner the observation optical system in the Z axis direction. The decentering section of the optical unit at the upper center of the optical element 31 is the same as that of the optical unit at the lower center of the optical element 31. It is similar to the first embodiment that the optical unit reflects the light flux twice, the internal total reflection may be formed, and the curved outer surface having a rotationally asymmetrical shape may be formed.

This embodiment provides an overlap area configured to display the same image to each image of each of the display elements that are horizontally and vertically divided. Therefore, similar to the third embodiment, this embodiment can prevent an image from chipping when the eyeball rotates, and absorb a manufacturing error of the prism and a positional offset between the display element and the prism.

It is similar to the first embodiment that the light-intensity controller may be provided for the overlap area, and the miniaturization can be achieved by increasing the power when the overlap area widens the display field angle.

In the optical system that utilizes the decentering reflective curved surface as in this embodiment, the aberrations is less influential when the power of the optical system is increased in the direction vertical to the decentering section. Hence, the power can be increased when the display field angle is widened by the overlap area. Since the focal length becomes shorter, the size vertical to the decentering section can be reduced.

When six optical units are integrated into one optical element 31 as in this embodiment, handling of the optical element becomes simpler and its holding becomes easier. As described above, the exit surfaces of the six optical units may provide the same plane. The same plane enables a smooth and continuous image to be observed because the continuity of the light flux that has passed the optical units is maintained.

It is similar to the above embodiments that when the optical elements are formed by dividing the six optical units separately, two neighboring optical units in the horizontal direction and two neighboring optical units in the vertical direction may be joined together.

By increasing the number of divisions of the combined image, an image at a wider field angle can be displayed and the usable display element may be made smaller. Therefore, the image display apparatus having an intended display field angle can be realized without relying upon the size of the usable display element.

This embodiment divides the horizontal field angle into three in the X axis direction, and the vertical field angle into two in the Y axis direction, providing the observation optical system configured to provide totally six divisions. However, the six divisions may be provided by exchanging the X axis and the Y axis.

This embodiment closely arranges the display elements by arranging three optical units and the same three optical units upside down so as to divide the vertical field angle into two. This configuration can make compact the space around the display elements, and enables one electronic circuit substrate to drive a plurality of display elements.

NUMERICAL EXAMPLE 1

Figure 8A:
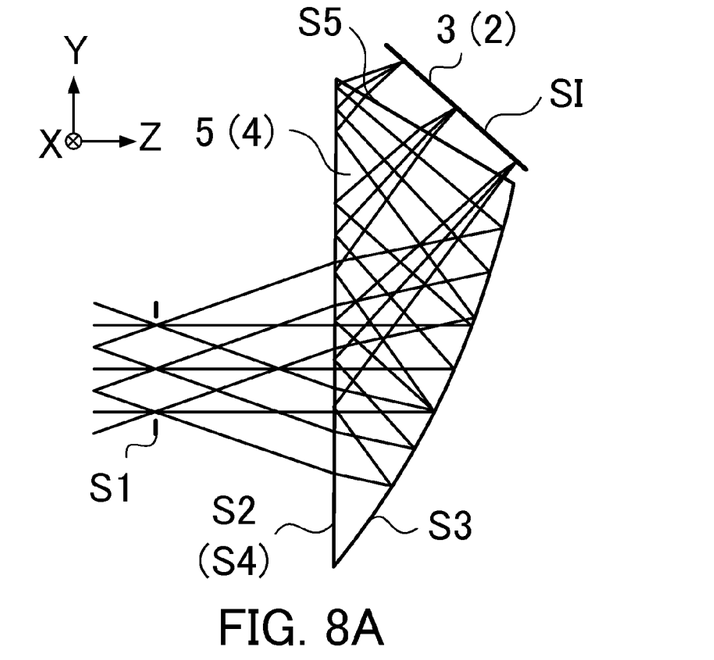
FIGS. 8A and 8B are perspective and side views of a numerical example 1 according to the first embodiment.
Figure 8B:
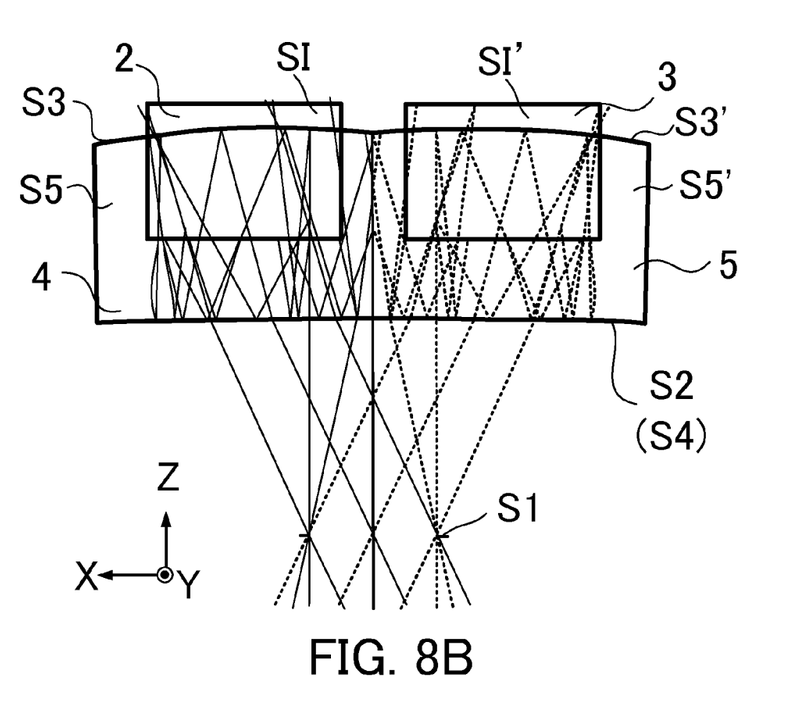

FIG. 8A is a side view of an observation optical system according to a numerical example 1 of the first embodiment. FIG. 8B is its top view. In the numerical example 1, the display element is set to an image plane, and a reverse ray tracing from the pupil position of the eyeball is illustrated. As illustrated, reference numeral S1 denotes an exit pupil, reference numeral SI denotes a display plane of the display element 2, SI' denotes a display plane of the display element 3. The surfaces S2 and S4 form the same plane, and the exit surfaces of the optical element form the same plane, as illustrated in FIG. 3.

A ray from the display plane SI of the display element 2 enters the optical unit 4 through the surface S5, is reflected on the surfaces S4 and S3, exits from the optical unit 4 through the surface S2, and is guided to the exit pupil S1. A ray from the display plane SI' of the display element 3 enters the optical unit 5 through the surface S5', is reflected on the surfaces S4 and S3', exits from the optical unit 5 through the surface S2, and is guided to the exit pupil S1.

The reflection on the surface S4 may be the internal total reflection so as to cut a loss of the light quantity, and the surfaces S2, S3, S3', S4, S5, and S5' are rotationally asymmetrical surfaces each having a plane-symmetry shape having one symmetrical surface. The plane-symmetry shape makes handing and manufacturing easier than those in the asymmetrical case.

Table 1 illustrates optical data of this numerical example.

TABLE 1

| SURF | X | Y | Z | A | B | R | TYP | Nd | vd |
|------|---|---|---|---|---|---|-----|-----|-----|
| 1 | 0 | 0 | 0 | 0 | 0 | | | | |
| 2 | 0 | 0 | 20.00 | −0.01 | 0 | −20671.1217 | FFS1 | 1.5709 | 33.8 |
| 3 | 0 | −19.25 | 22.28 | −37.03 | 6.52 | −89.0504 | FFS2 | −1.5709 | 33.8 |
| 4 | 0 | 0 | 20.00 | −0.01 | 0 | −20671.1217 | FFS1 | 1.5709 | 33.8 |
| 5 | 0 | 29.26 | 25.63 | 60.10 | 6.44 | −90.1487 | FFS3 | 1 | |
| I | 0 | 35.00 | 27.00 | 49.00 | 0 | | | | |

| FFS1 | c1 | −1.36E+02 | c5 | −7.06E−05 | c6 | 1.52E−05 | c10 | −6.59E−07 |
|------|-----|-----------|-----|-----------|-----|----------|-----|-----------|
|      | c11 | −1.03E−05 | c12 | −5.72E−08 | c13 | −5.99E−08 | c14 | −2.39E−08 |
|      | c20 | −6.39E−11 | c21 | −5.92E−10 | c22 | −1.07E−09 | c23 | 3.23E−11 |
|      | c24 | −4.26E−12 | c25 | −3.29E−12 | c26 | −1.05E−12 | | |
| FFS2 | c1 | −9.30E−03 | c5 | −2.97E−04 | c6 | −1.98E−05 | c10 | 4.33E−07 |
|      | c11 | −3.19E−06 | c12 | 4.09E−08 | c13 | −4.61E−09 | c14 | 5.44E−10 |
|      | c20 | −6.62E−12 | c21 | −6.19E−11 | c22 | 1.33E−10 | c23 | 1.61E−11 |
|      | c24 | −1.49E−13 | c25 | 2.12E−13 | c26 | −7.79E−14 | | |
| FFS3 | c1 | 1.75E+00 | c5 | −1.18E−03 | c6 | 1.26E−03 | c10 | −1.00E−05 |
|      | c11 | 1.69E−05 | c12 | −7.28E−07 | c13 | −4.03E−07 | c14 | −4.65E−08 |
|      | c20 | 4.28E−09 | c21 | 3.14E−09 | c22 | 2.20E−09 | c23 | −3.81E−09 |
|      | c24 | −6.74E−10 | c25 | −2.44E−10 | c26 | −1.44E−10 | | |

This embodiment has an elliptical exit pupil with a minor axis of 9.6 mm in the vertical direction and a major axis of 12 mm in the horizontal direction. The display element 2 has an image display size of about 0.81 inches (11.4 mm×17.2 mm), and displays an image of a horizontal field angle of 50° (overlap area in an angular range of 24°) and a vertical field angle of 38° at infinity in the positive direction of the Z axis. Since this embodiment displays and divides the horizontal field angle utilizing the two display elements, the horizontal angle of the display element 2 corresponds to 37° from +25° to −12°. The vertical field angle of 38° remains since it is not divided.

The data of the optical unit 5 of this embodiment corresponds to the data in Table 1 in which codes of B values for the surfaces S3 and S5 are turned into negative.

In Table 1, "SURF" denotes a surface number, and X, Y, and Z denote X, Y, and Z coordinate values at each surface vertex. "A" denotes a rotation around the X axis expressed with a degree as the unit where the counterclockwise direction is set to the positive direction. "B" denotes a rotation around the Y axis expressed with a degree as the unit where the counterclockwise direction is set to the positive direction. "R" denotes a radius of curvature. "TYP" denotes a type of a surface shape. "FFS" denotes a rotationally asymmetrical surface expressed by the following expression. A number subsequent to "FFS" denotes an aspheric coefficient expressed in the column of a corresponding number under the table. A value of the coefficient is 0 when there is no aspheric coefficient. Nd and vd denote a refractive index and Abbe number for the d-line of a material subsequent to the target surface. When the medium is air, only the refractive index Nd is expressed as 1.000 and the Abbe number vd is not displayed: FFS:

$$z = (1/R)*(x^2+y^2)/\left(1+(1-(1+k)*(1/R)^2*(x^2+y^2))^{(1/2)}\right) +$$
$$c2 + c4*y + c5*(x^2-y^2) + c6*(-1+2*x^2+2*y^2) +$$
$$c10*(-2+y+3*x^2*y+3*y^3) + c11*(3*x^2*y-y^3) +$$
$$c12*(x^4-6*x^2*y^2+y^4) + c13*(-3*x^2+4*x^4+3*y^2-4*y^4) +$$
$$c14*(1-6*x^2+6*x^4-6*y^2+12*x^2*y^2+6*y^4) +$$
$$c20*(3*y-12*x^2*y+10*x^4*y-12*y^3+20*x^2*y^3+10*y^5) +$$
$$c21*(-12*x^2*y+15*x^4*y+4*y^3+10*x^2*y^3-5*y^5) +$$
$$c22*(5*x^4*y-10*x^2*y^3+y^5) +$$
$$c23*(x^6-15*x^4*y^2+15*x^2*y^4-y^6) +$$
$$c24*(-5*x^4+6*x^6+30*x^2+30*x^2*y^2-30*x^4*y^2-5*y^4-$$
$$30*x^2*y^4+6*y^6) + c25*(6*x^2-20*x^4+15*x^6-$$
$$6*y^2-15*x^4*y^2+20*y^4-15*x^2*y^4-15*y^6) +$$
$$c26*(-1+12*x^2-30*x^4+20*x^6+12*y^2-60*x^2*y^2+$$
$$60*x^4*y^2-30*y^4+60*x^2*y^4+20*y^6) + \ldots$$

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-186821, filed Aug. 30, 2011 which is hereby incorporated by reference herein in its entirety.

What is claimed is:

1. An image display apparatus comprising:
   first and second display elements each configured to display an original image; and
   an observation optical system having a first optical unit including a first reflecting surface and configured to introduce light flux from the first display element to an exit pupil, and a second optical unit including a second reflecting surface and configured to introduce light flux from the second display element to the exit pupil, wherein the observation optical system is configured to present a combined image,
   wherein
   when a first decentering plane is defined as a plane including a light path before a principal ray of the light flux introduced to a prescribed point on the combined image by the first optical unit enters the first reflecting surface and a light path after the principal ray is reflected on the first reflecting surface, and a second decentering plane is defined as a plane including a light path before a principal ray of the light flux introduced to the prescribed point by the second optical unit enters the second reflecting surface and a light path after the principal ray is reflected on the second reflecting surface, the first decentering plane and the second decentering plane are parallel to each other, and
   wherein a part of a display surface of the first display elements and a part of a display surface of the second display element display the same image.

2. The image display apparatus according to claim 1, further comprising an electronic circuit substrate mounted with and configured to drive the first and second display elements.

3. The image display apparatus according to claim 1, wherein exit surfaces of the first and second optical units form the same optical plane.

4. The image display apparatus according to claim 1, wherein the first and second optical units correspond to the first and second display elements, respectively and the first and second optical units are formed as two separate members and jointed together.

5. The image display apparatus according to claim 1, wherein the first and second optical units correspond to the first and second display elements, respectively and the first and second optical units are formed as part of one optical element.

6. The image display apparatus according to claim 1, wherein the observation optical system includes a first optical element including the first and second optical units and a second optical element including a third and fourth optical units,
   wherein incident surfaces of the first and second optical units of the first optical element are located on opposite side of those of the third and fourth optical units of the second optical element, and
   wherein each of the first and second optical units of the first optical element and the third and fourth optical units of the second optical element include optical units that have a common decentering plane.

7. The image display apparatus according to claim 6, wherein a display plane of a display element that corresponds to the first optical element and a display plane of a display element that corresponds to the second optical element partially display the same image.

8. The image display apparatus according to claim 1, further comprising a light-intensity controller configured to control a light intensity on the exit pupil corresponding to a portion that displays the same image in the first and second of display elements.

9. The image display apparatus according to claim 6, wherein light fluxes from the first optical element and the second optical element to the prescribed point on the combined image have an overlap on the exit pupil.

10. The image display apparatus according to claim 9, further comprising a light-intensity controller configured to control a light intensity of the overlap on the exit pupil.

11. An image display apparatus comprising:
first and second display elements each configured to display an original image; and
an observation optical system having a first optical unit including a first reflecting surface and configured to introduce light flux from the first display element to an exit pupil, and a second optical unit including a second reflecting surface and configured to introduce light flux from the second display element to the exit pupil, wherein the observation optical system is configured to present a combined image,
wherein
when a first decentering plane is defined as a plane including a light path before a principal ray of the light flux introduced to a prescribed point on the combined image by the first optical unit enters the first reflecting surface and a light path after the principal ray is reflected on the first reflecting surface, and a second decentering plane is defined on as a plane including a light path before a principal ray of the light flux introduced to the prescribed point by the second optical unit enters the second reflecting surface and a light path after the principal ray is reflected on the second reflecting surface, a line of intersections between the first decentering plane and the second decentering plane does not accord with a line that is made by connecting a center of the exit pupil and an arbitrary point in the combined image, and
wherein a part of a display surface of the first display elements and a part of a display surface of the second display element display the same image.

12. The image display apparatus according to claim 11, further comprising an electronic circuit substrate mounted with and configured to drive the first and second display elements.

13. The image display apparatus according to claim 11, wherein exit surfaces of the first and second optical units form the same optical plane.

14. The image display apparatus according to claim 11, wherein the first and second optical units correspond to the first and second display elements, respectively and the first and second are formed as two separate members and jointed together.

15. The image display apparatus according to claim 11, wherein the first and second optical units correspond to the first and second display elements, respectively and the first and second optical units are formed as part of one optical element.

16. The image display apparatus according to claim 11, wherein the observation optical system includes a first optical element including the first and second optical units and a second optical element including a third and fourth optical units,
wherein incident surfaces of the first and second optical units of the first optical element are located on opposite side of those of the third and fourth optical units of the second optical element, and
wherein each of the first and second optical units of the first optical element and the third and fourth optical units of the second optical element include optical units that have a common decentering plane.

17. The image display apparatus according to claim 16, wherein a display plane of a display element that corresponds to the first optical element and a display plane of a display element that corresponds to the second optical element partially display the same image.

18. The image display apparatus according to claim 11, further comprising a light-intensity controller configured to control a light intensity on the exit pupil corresponding to a portion that displays the same image in the first and second of display elements.

19. The image display apparatus according to claim 16, wherein light fluxes from the first optical element and the second optical element to the prescribed point on the combined image have an overlap on the exit pupil.

20. The image display apparatus according to claim 19, further comprising a light-intensity controller configured to control a light intensity of the overlap on the exit pupil.

* * * * *